T. WEBER.
COUPLING.
APPLICATION FILED MAR. 8, 1920.
1,375,266.
Patented Apr. 19, 1921.
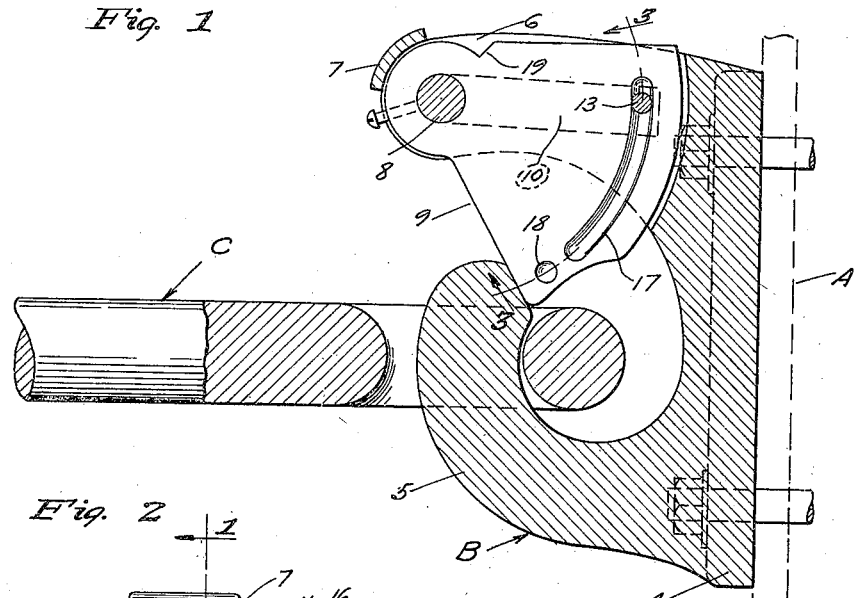
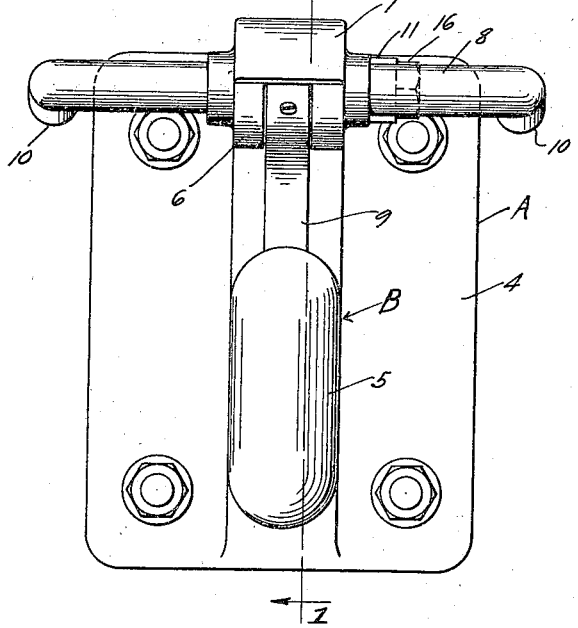
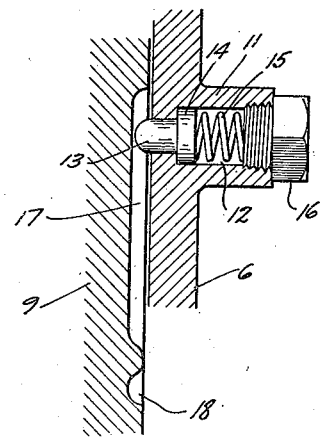
Inventor
Tobias Weber
by Westall and Wallace
his Attorneys

UNITED STATES PATENT OFFICE.

TOBIAS WEBER, OF LOS ANGELES, CALIFORNIA.

COUPLING.

1,375,266.      Specification of Letters Patent.      Patented Apr. 19, 1921.

Application filed March 8, 1920. Serial No. 363,968.

*To all whom it may concern:*

Be it known that I, TOBIAS WEBER, a citizen of the United States, residing at Los Angeles, in the county of Los Angeles and State of California, have invented new and useful Improvements in Couplings, of which the following is a specification.

The coupling shown herein is of a type adapted for connecting trailers to automobile trucks or tractors. It is common practice to have an eye coupling bar at the forward part of a trailer. The plane of the eye is horizontal and the bar is engaged with a hook secured to the rear of the leading vehicle. It is the primary object of my invention to provide a coupling with a hook having a guard offering substantially no obstacle to the engagement of the eye with the hook but preventing accidental disengagement therefrom. It is another object of this invention to provide a hook having a guard with means to manually move the guard to open the hook and means to maintain it in open position. A further object of this invention is to provide details of structure, whereby a simple, strong, and easily manipulated structure is obtained.

These objects will be more fully understood from the following detailed description of a preferred embodiment of my invention. For the purpose of this description, reference is had to the accompanying drawing, in which:

Figure 1 is a side elevation in section as seen on the line 1—1 of Fig. 2; Fig. 2 is a front elevation of the hook; and Fig. 3 is an enlarged section as seen on the line 3—3 of Fig. 1.

Referring more particularly to Fig. 1, a portion of the body of a vehicle is indicated by A. Secured thereto is a hook B, and engaged with the hook is an eye bar, a fragment thereof partially in section being indicated by C.

Referring more particularly to the hook, it is formed with an attachment plate or base 4 with the crook 5 outstanding therefrom. Overhanging the jaw of the hook is a bifurcated bracket portion 6 formed with a stop 7 bridging the arms. The forward end of the bracket has a bearing formed therein for the reception of a pivot shaft 8, to which a guard 9 is secured. Guard 9 is of fan shape and mounted between the arms of the bracket so as to swing freely therein. The weight of the guard is so distributed that when the hook is in a vertical position, as shown, it will tend to swing downwardly and close the mouth of the hook.

For convenient operation of the guard in opening the hook to release the eye, the shaft has lateral extensions at its ends indicated by 10. These extensions are handles convenient for grasping in lifting the guard. They are also disclosed in such a position that their weight assists in keeping the guard closed by gravity.

Formed on one of the arms of the brackets is a boss 11 having a bore 12 threaded at the outer end and reduced in diameter at the inner end. A detent pin 13 having a collar 14 is disposed in the boss, and mounted thereon is a compression spring 15 held in position by a plug 16 closing the bore. The spring 15 presses the pin 13 outwardly, while collar 14 engaging the shoulder in the bore limits the projection of the pin.

Formed in one side of the guard is an arcuate channel 17 of such length that the detent pin 13 will be disposed therein when the guard closes the hook and when it is in open position with its lower outer edge in alinement with the lower edge of the hook bracket. This position obtains, when the guard is forced inwardly by pressing upon its outer lower edge. The channel is of such depth that pin 13 in its outermost position will not engage the wall thereof. Thus, the guard is free to swing from open to closed position without any resistance from the detent pin. Beyond the lower end of the channel 17 is a recess 18 disposed to receive the detent pin when the lower outer edge of the guard is swung beyond the mouth of the hook.

The hook and its guard are normally in the position shown in Figs. 1 and 2. If it is desired to remove the eye bar from engagement with the hook to uncouple the trailer, one of the handles 10 is grasped and the guard lifted to permit removal of the eye. If it is desired to hold the guard in open position, it is swung to the limit of its movement so that detent pin 13 engages the recess 18. The guard will then be held in its open position until the detent is forced out of the recess by pressing downwardly upon either of the handles 10 of the body of the guard. To strengthen the hook bracket and to limit movement of the guard, the stop 7 is provided. This stop is engaged by a shoulder 19 formed upon the guard. When it is desired to couple a trailer, the eye bar thereof is pressed against the guard 9, the latter being lifted thereby and the eye moving to engagement with the hook, after which the guard drops by gravity to its position closing the hook. The hook is maintained in its closed position by the weight of the guard.

What I claim is:

1. A coupling member comprising a hook, a gravity operated guard for closing the mouth of said hook, said guard having a shaft secured thereto pivotally mounted on said hook and forming a handle for manipulating the guard, said guard being mounted to swing away from the point of said hook and to close the mouth thereof by engaging the inner side of the point, and a detent on said hook disposed to engage a recess in said guard for holding the latter in open position.

2. A coupling member comprising a hook and a gravity operated guard for closing the mouth of said hook, said guard having a shaft secured thereto pivotally mounted on said hook and bent laterally to form a handle so disposed as to assist in holding said guard closed, said guard being mounted to swing away from the point of said hook and to close the mouth thereof by engaging the inner side of the point, and a detent on said hook disposed to engage a recess in said guard for holding the latter in open position.

In witness that I claim the foregoing I have hereunto subscribed my name this 27th day of February, 1920.

TOBIAS WEBER.